No. 893,240. PATENTED JULY 14, 1908.
W. HAY.
DETACHABLE CHAIN.
APPLICATION FILED MAY 13, 1907.
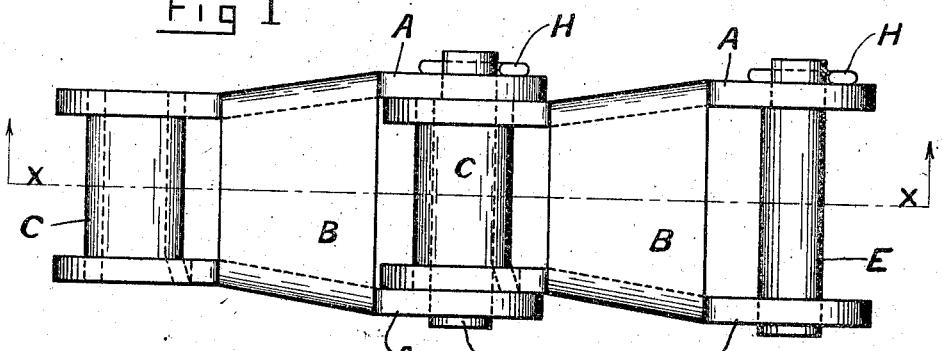
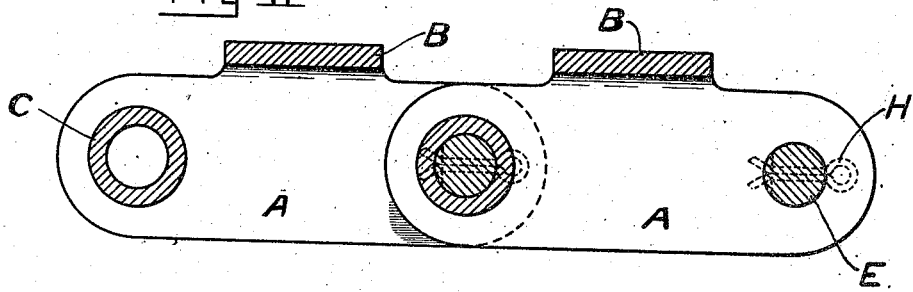
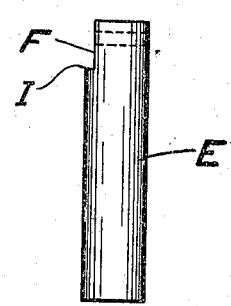
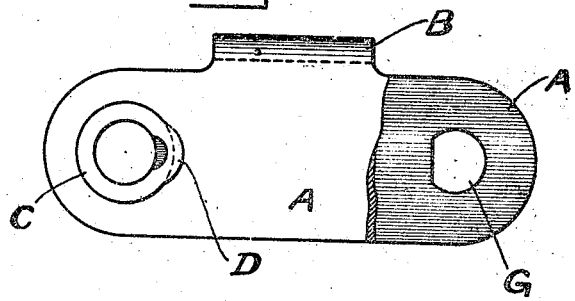
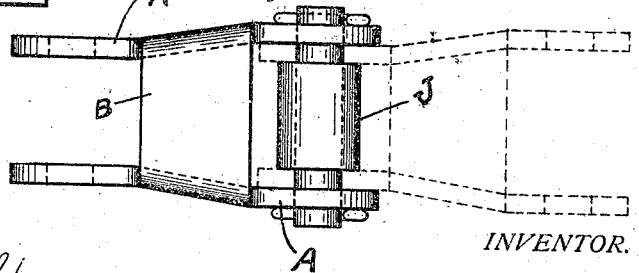
WITNESSES: John E. Diehl, Ed. L. Clark
INVENTOR. Walter Hay.

UNITED STATES PATENT OFFICE.

WALTER HAY, OF ERIE, PENNSYLVANIA.

DETACHABLE CHAIN.

No. 893,240.

Specification of Letters Patent.

Patented July 14, 1908.

Application filed May 13, 1907. Serial No. 373,485.

*To all whom it may concern:*

Be it known that I, WALTER HAY, a citizen of the United States, residing at Erie, in the county of Erie and State of Pennsylvania, have invented a new Detachable Chain, of which the following is a specification.

This invention relates to that class of chains used for the transmission of power and for elevating and conveying materials. In the present state of the art such chains may, for the purpose of more clearly pointing out the advantages of the present invention, be subdivided into three classes; first, those constructed of one piece detachable cast links; second, those constructed entirely of wrought metal, and third, those constructed partly of cast links and partly of wrought metal links. Chains in the first class are extensively used owing to their comparatively low first cost; the links being rigid resist any tendency of the chain to twist, and are easily cast in the many forms termed attachment links; however, the links are generally connected together in the rough and with no provision for excluding gritty particles from the joints rapid wear soon renders them useless and where subjected to sudden strains breakage frequently occurs; chains in the second class are naturally superior in strength and durability to cast link chains, yet their first cost is comparatively high and even prohibitive in many cases; they are constructed with links having double link members and hence are somewhat complicated and easily twisted which latter is undesirable in some classes of work, for instance, when used in connection with buckets for elevating materials within a casing, the buckets frequently departing from alinement through twisting of the chain and rubbing against the insides of the casing; chains in the third class lack the rigidity of those in the first class and the strength of those in the second class, hence not having advantages commensurate with their additional cost over those of the first class, their use affords questionable relief.

Aiming to overcome the undesirable features described I have constructed a detachable link chain which combines the advantages and better qualities found in other chains of this class along with additional improvements comprising a novel construction which will be readily understood from the following detailed description and by reference to the accompanying drawing in which Figure 1 represents a plan view of a pair of chain links constructed in accordance with the present invention, Fig. 2, a sectional elevation on the line X, X, Fig. 3, a side elevation of a link with a portion of the near side broken away, Fig. 4, a plan view of the coupling pin and Fig. 5, a plan view of a link showing a modification of construction.

Referring to Figs. 1, 2 and 3 it will be observed that the sides or side portions A, A, of each link are connected at an intermediate point by an integral bridge-like connection B, and that by means of such connection the side portions can be stamped in one piece from plate or sheet metal and the link then formed by bending the said side portions at approximately right angles to the connection B; the sides or side portions A, A, are so formed that the extremities thereof are parallel with each other and spaced further apart at one end of the link than at the opposite end whereby the expanded end is adapted to receive the contracted end of an adjoining link in the one direction and the contracted end to enter the expanded end of an adjoining link in the opposite direction when forming a chain. Hence it is obvious that all links in such a chain are interchangeable and can be stamped and formed by the same dies, minimizing the cost of manufacturing and permitting the chain to be shortened at any time by removing a single link. In the contracted end of each link is a perforation through both the oppositely disposed side portions to receive the tube C which is closely fitted therein; in one of the side portions said perforation is elongated as at D, Fig. 3, and a portion of one end of the tube C is expanded to fit such elongated perforation whereby the tube cannot turn in the link; by reference to Fig. 1 it will be observed that the tube is confined longitudinally by the adjoining link; in the expanded end of each link is a perforation through both the oppositely disposed side portions to receive the coupling pin E; in one of the side portions said perforation is formed with a flat side as at G, Fig. 3, and the end of the coupling pin passing through this perforation has a flattened side as at F, Fig. 4, to correspond in form with such perforation whereby the coupling pin is prevented from turning in the link; the flattened portion of the coupling pin terminates in a shoulder I which when in contact with the inner face of one of the side portions prevents longitudinal movement of the pin in one direction while longitudinal movement in the opposite direction is prevented by a cotter pin H passing transversely through the extremity of the coupling pin so as to contact with the outer face of the side portion, as will be readily understood by reference to Fig. 1.

With this novel construction it is apparent that the length of bearing subject to wear at the joints is equal to the length of the tubes, and the links being constructed of plate or sheet metal of practically uniform thickness and the coupling members having smooth wearing surfaces, practically uniform strength and maximum durability naturally result; also that the contracted end of one link closely fitting within the expanded end of another a practically dust proof bearing-joint is produced; also that each link having its two sides or side portions stamped and formed in one piece, rigidity to prevent twisting, simplicity and economy of manufacture are attained; and also that the coupling and uncoupling of the links at any point in the chain is possible and without requiring "slack" or a surplus of chain for the operation. Another important advantage is that when the tubes and coupling pins are sufficiently worn they may be easily removed and new ones substituted, greatly adding to the economy of the chain.

In Fig. 5 is shown a modification in the arrangement of the coupling members; the tube J, instead of entering the link, is loosely mounted on the coupling pin and thus permits a rolling contact when running over a sprocket wheel.

It should be understood that I do not confine myself to the exact details of construction here shown, varying requirements of work necessitating slight modifications, for example, the connection B may be of various shapes and located at any point intermediate the extremities of the link for convenience in securing elevating and conveying attachments thereto; the coupling pin may be held in position longitudinally by means of a cotter pin through each end; or a coupling pin having a head at one end, or a common bolt, may be used for coupling without departing from the scope of this invention.

What I claim as my invention is—

1. A chain link formed in one piece and comprising side portions A, A, and an integral bridge-like connection B connecting said side portions at an intermediate point.

2. An interchangeable chain link formed in one piece and comprising oppositely disposed side portions A, A, an integral bridge-like connection B, the extremities of the side portions being spaced further apart at one end of the link than at the opposite end.

3. An interchangeable chain link comprising side portions A, A, formed at or near their longitudinal center with an offset portion whereby the extremities of the side portions are spaced further apart at one end of the link than at the opposite end, and an integral bridge-like connection B connecting the edges of the offset portions of the said side portions.

4. A chain link formed in one piece and comprising side portions A, A, formed at an intermediate point with an angular offset portion, the extremities of the side portions being parallel with each other and spaced further apart at one end of the link than at the opposite end, the side portions being formed in one piece by means of the integral bridge-like connection B.

5. A chain link formed in one piece and comprising side portions formed with an opening in each of the oppositely disposed extremities, one of the openings being elongated, a tube passing through the openings near one end of the link, said tube having the side of one end expanded to correspond in shape with the elongated opening.

6. In a detachable chain, the combination of a pair of links, a coupling pin connecting the links and having a shoulder near one end thereof, and a cotter pin passing through the coupling pin and coöperating with the shoulder to prevent any longitudinal movement of the coupling pin.

7. In a chain, the combination of a pair of links comprising side portions A, A, formed with corresponding openings, one of the openings having a flattened side, a coupling pin passing through the corresponding openings and having the side of one end thereof flattened corresponding to the flattened portion of the opening, the flattened portion of the pin terminating in a shoulder, and a cotter pin passing through the coupling pin and coöperating with the shoulder to prevent longitudinal displacement of the coupling pin.

8. In a chain, the combination of a pair of links, each link comprising side portions A, A, and an integral bridge-like connection B, said side portions formed with corresponding openings, the contracted end of one link fitting within the expanded end of the adjoining link, a coupling pin passing through the corresponding openings, and a tube or sleeve carried by the coupling pin.

In testimony whereof I affix my signature in presence of two witnesses.

WALTER HAY.

Witnesses:
C. B. HAYES,
W. V. HANLEY.